United States Patent
Simonsson et al.

(10) Patent No.: US 7,969,935 B2
(45) Date of Patent: Jun. 28, 2011

(54) TRANSPARENT BROADCAST STRUCTURE IN COMMUNICATION SYSTEMS

(75) Inventors: Arne Simonsson, Gammelstad (SE); Tor Björn Minde, Gammelstad (SE); Peter de Bruin, Gammelstad (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 12/857,406

(22) Filed: Aug. 16, 2010

(65) Prior Publication Data

US 2010/0311448 A1    Dec. 9, 2010

Related U.S. Application Data

(62) Division of application No. 11/226,485, filed on Sep. 14, 2005.

(60) Provisional application No. 60/612,161, filed on Sep. 23, 2004.

(51) Int. Cl.
*H04W 4/00*    (2009.01)

(52) U.S. Cl. ........ 370/328; 370/326; 370/431; 370/262; 370/441; 455/414.2; 725/67; 725/71; 725/93; 725/94; 725/95; 725/116; 725/146

(58) Field of Classification Search .................. 370/328, 370/326, 295.64, 262, 441, 431, 26; 455/414.2; 725/67, 71, 93–95, 116, 146

See application file for complete search history.

(56) References Cited

U.S. PATENT DOCUMENTS

| | | | |
|---|---|---|---|
| 6,778,521 B1 * | 8/2004 | Korpela et al. | 370/345 |
| 2002/0019979 A1 * | 2/2002 | Koreeda et al. | 725/39 |
| 2002/0066101 A1 * | 5/2002 | Gordon et al. | 725/43 |
| 2004/0223513 A1 * | 11/2004 | Meago | 370/468 |
| 2004/0227618 A1 * | 11/2004 | Hwang et al. | 340/7.46 |

\* cited by examiner

*Primary Examiner* — Nimesh Patel (74) *Attorney, Agent, or Firm* — Potomac Patent Group PLLC (57) ABSTRACT

A broadcast channel, such as a broadcast control channel that carries a short message service, in a GSM/EDGE or similar communication system can be extended with additional timeslots. These additional timeslots can be pointed out in a tree structure, the root of which is in the SMS broadcast channel. The extended broadcast channel can be used for broadcast-like services provided under a multimedia broadcast/multicast service.

9 Claims, 4 Drawing Sheets

TRANSPARENT BROADCAST STRUCTURE IN COMMUNICATION SYSTEMS

This application claims the benefit of U.S. Provisional Patent Application No. 60/612,161, filed on Sep. 23, 2004, which is incorporated in its entirety here by reference. This application is a division of U.S. patent application Ser. No. 11/226,485 filed on Sep. 14, 2005, which is now abandoned.

BACKGROUND

This application relates to mobile communication systems and in particular to television broadcasting in such communication systems.

"Broadcast-like" television (TV) services, which is to say, services with a conventional-television-channel concept, are already available for some mobile telephony networks. For example, the Mobile TV service of Telecom Italia Mobile (TIM) provides TIM subscribers with streaming content, enabling subscribers to watch TV shows on their mobile phones via GSM's general packet radio service (GPRS) technology. Another example is sports-team goal notification services, such as that provided by Vodafone, which uses GSM's multimedia messaging service (MMS). These current implementations are based on real-time streaming over unicast GPRS bearers, but capacity limits on application servers and core and radio access networks constrain service expansion and build-out. A few network operators currently deliver broadcast-like services in wideband code division multiple access (WCDMA) communication systems by circuit-switched (CS) streaming.

A multimedia broadcast/multicast service (MBMS) in GSM and WCDMA communication systems is currently standardized by the Third Generation Partnership Project (3GPP) in Technical Specification (TS) 23.246 "Multimedia Broadcast/Multicast Service (MBMS); Architecture and functional description", V6.6.0, Rel. 6 (March 2003). According to the specification, MBMS is a point-to-multipoint service, in which data is transmitted from a single source entity to multiple recipients. Transmitting the same data to multiple recipients allows network resources to be shared, and the MBMS bearer service has broadcast and multicast modes. With MBMS, a complete set of multicast and broadcast services can be offered in telecommunication systems, such as UMTS and mobile telephony systems according to the GSM, Enhanced Data Rates for GSM Evolution (EDGE), and WCDMA specifications. The GSM EDGE radio access network is usually abbreviated as GERAN. Changes to network architecture as well as additional service-related signaling will be introduced to the existing systems by deployment of MBMS. Aspects of MBMS are described in M. Bakhuizen et al., "Mobile Broadcast/Multicast in Mobile Networks", *Ericsson Review* vol. 82, no. 1, pp. 6-13 (2005).

Audio and video coder/decoders (codecs) used for streaming sessions for the small display screens typical of handheld devices are improving and are standardized by the 3GPP, e.g., TS 26.234 "Transparent end-to-end Packet-switched Streaming Service (PSS); Protocols and codecs", V6.3.0, Rel. 6 (March 2003). Current implementations like the TIM Mobile TV service use streams that have data rates of 28 kilobits per second (kbps), but for very high quality content, the data rate needed is probably more than 100 kbps. For an intermediate level of quality, a data rate of 40-64 kbps is needed for a stream comprising both audio and video. For example, 12 kbps could be used for stereo audio encoded according to an adaptive multi-rate wideband codec (AMR-WB+) and 32 kbps for video encoded according to an MPEG-4 codec. Considering user sensitivity to errors in such streams, a block error rate (BLER) of 1%-2% or less may be needed for acceptable performance.

Another ongoing standardization activity is the Digital Video Broadcasting (DVB) Project, which aims at including DVB receivers in mobile terminals, such as mobile telephones. A recent standard is "Digital Video Broadcasting (DVB); Transmission System for Handheld Terminals (DVB-H)", ETSI EN 302 304 V1.1.1 (June 2004). This is an extension of the current DVB-terrestrial (DVB-T) standard to support handheld devices and introduces a new transmission mode, IP datacasting (IPDC), which is described in "IPDC in DVB-H: Technical requirements", DVB Project (June 2004). IPDC is the end-to-end DVB system, including a mobile interaction channel for mobile handheld broadcast services. See also "IP Datacast Baseline Specification; PSI/SI Guidelines for DVB-T/H Systems", document A079, DVB Project (April 2004). For even more information, the interested reader is directed to http://www.dvb.org.

Moreover, inclusion of a separate DVB-H receiver in a user terminal also requires new terminal hardware and antennas. Different antennas might be needed in different countries due to spectrum allocations. Interoperability testing and verification due to new network nodes will delay introduction. Local distribution of programs/channels will be costly due to needed modifications of network structure, which is typically designed for national or regional coverage.

Compared with DVB-H and DVB-T, GERAN/UTRAN MBMS has a lower data rate. On the other hand, GERAN/UTRAN MBMS can transmit different information in each cell. Thus, GERAN/UTRAN MBMS is suitable for broadcasting content that is locally variable or broadcast/multicast-group dependent. UTRAN, or the UMTS Terrestrial Radio Access Network, is part of the Universal Mobile Telecommunication System (UMTS) and identifies the part of the network that includes radio network controllers (RNCs) and so-called Node Bs, which are analogous to base stations in other mobile telephone systems. UMTS is one of the third generation (3G) mobile telephone systems being developed within the IMT-2000 framework of the International Telecommunications Union (ITU) and standardized by the 3GPP.

Even so, to be competitive with DVB-H, the performance of cellular broadcast bearers can stand improvement. Dedicated unicast channels in either Enhanced GPRS (EGPRS) or WCDMA systems are difficult to use for mobile TV streaming because such channels will not scale to large usage. This problem of capacity limitations in the radio network is helped by MBMS, which provides one dedicated channel for each group of terminals receiving the same content. Nevertheless, a separate channel for a program guide or service description is also needed. Channel switching may also be slow with the currently standardized MBMS due to delays caused by restart of streaming sessions.

SUMMARY

In accordance with an aspect of this invention, a channel structure configured for distribution of multimedia information in a communication system is provided. The channel structure includes a broadcast communication channel divided into a plurality of timeslots; and a pointer included in a predetermined one of the timeslots. The pointer points out at least one extension channel that is included in at least one other broadcast timeslot and that carries unacknowledged multimedia information.

In accordance with another aspect of this invention, a radio access network configured for distribution of multimedia information is provided. The radio access network includes a base station that broadcasts radio signals having a channel structure configured for the multimedia information, wherein the radio channel structure includes a broadcast communication channel divided into a plurality of timeslots, and a predetermined one of the timeslots includes a pointer that points out at least one extension channel that is included in at least one other timeslot in the radio signals and that carries unacknowledged multimedia information In accordance with yet another aspect of this invention, a user equipment for a communication network in which a broadcast signal includes a succession of timeslots that carry unacknowledged multimedia information is provided. The user equipment includes an input device configured for activation by a user; a receiver configured to decode the broadcast signal, and a control processor in communication with the input device and the receiver. A predetermined one of the timeslots includes a pointer that points out at least one extension channel that is included in at least one other timeslot of a broadcast signal. Based on user-input information from the input device and information about the communication network, the control processor determines at least one timeslot to receive and decode and causes the receiver to receive and decode the determined timeslot.

In accordance with a further aspect of this invention, a method of distributing multimedia information in a communication system is provided. The method includes the steps of dividing a broadcast communication channel into a plurality of timeslots; and including a pointer in a predetermined one of the timeslots. The pointer points out at least one extension channel that is included in at least one other timeslot of a broadcast communication channel and that carries unacknowledged multimedia information.

BRIEF DESCRIPTION OF THE DRAWINGS

The several features, objects, and advantages of this invention will be understood by reading this description in conjunction with the drawings, in which.

DETAILED DESCRIPTION

The inventors have recognized that the existing short message service (SMS) broadcast channel that is typically carried by timeslot zero (TS0) on a broadcast control channel (BCCH) in a GSM/EDGE or similar communication system can be extended with additional timeslots and that these additional timeslots can be pointed out in a tree structure, the root of which is in the SMS broadcast channel. A BCCH typically carries overhead messages, e.g., paging or call alert messages, as well as text messages like SMS, directed to individual terminals.

The inventors have also recognized that such an extended BCCH can be used for broadcast-like services and that it has no need for interaction between communication terminals, such as mobile telephones, and the infrastructure part of the communication system, such as base stations or Node Bs. A terminal receives only the broadcast channels that the base station transmits, and each broadcast channel carries unacknowledged multimedia information. In this way, ordinary EGPRS channels can be set up from a media server to the broadcast channels in the base stations. The number of channels, channel content, and the channel structure can be defined by a system operator by suitable dimensioning and program production. A terminal can select a broadcast channel and buffer or download broadcast content with a suitable software application executing in the terminal. Content may be buffered, or cached, for shorter times to compensate for network latency, decoder delay, etc., or downloaded for longer times to enable "off-line" or non-real-time presentation of broadcast content. Buffering, or caching, real-time multimedia streaming content can minimize glitches in the data transfer and also channel switching time by having several receive buffers filled up all the time. Also, the same or another software application can select the best frequency to receive, and thus in effect cause a handover of the terminal.

Figure 1:
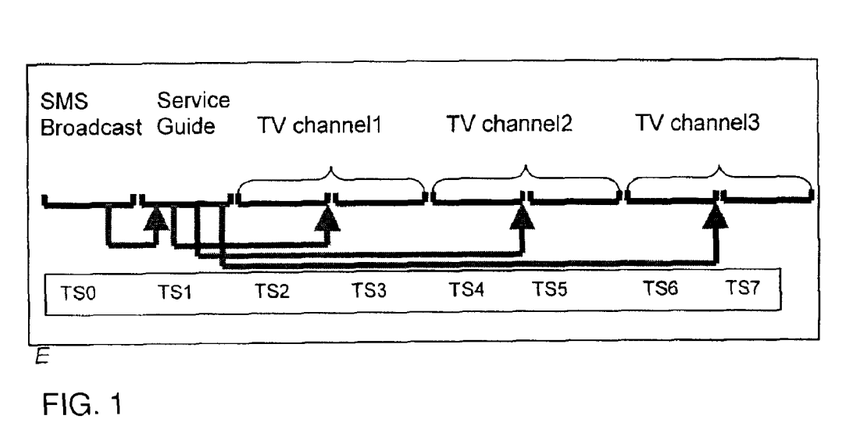
FIG. 1 depicts a broadcast channel having a plurality of timeslots.

FIG. 1 depicts a plurality of timeslots TS0, TS1, TS2, . . . , TS7 that are temporal portions of a carrier signal. In GSM/EDGE, TS0 of the BCCH carries SMS information, and an SMS broadcast channel may carry 15 pages with 93 characters.

The inventors have understood that a pointer or token, such as a character string, that points out an extension channel can be inserted in a timeslot, such as in any of the pages broadcast on a typical SMS channel. For example, the string, "Broadcast: BCCH TS1: BBC", could be inserted into a page carried by TS0. As suggested by the string itself and as described in more detail below, such a string can point to another BCCH timeslot or timeslots and indicate information to be found there. In this example, timeslot TS1 of the BCCH has information about a British Broadcasting Corporation (BBC) channel.

It will be appreciated that any suitable pointer can be used, not merely a character string, and that the pointer need only be included in a predetermined slot on virtually any broadcast channel. Moreover, the pointer need not point to a slot or slots on its own channel, but in general can point to any other slot or slots transmitted in the communication system. In addition, the pointer can include information that is "open", i.e., presented to a user, and information that is "hidden", i.e., information that is used by the user's equipment but need not be presented to the user. Some examples of such hidden information are information on the modulation and coding scheme used for a broadcast channel or channels, and information on which timeslot corresponds to which broadcast channel.

As in the example shown by FIG. 1, the first extension channel carried in a timeslot such as timeslot TS1 and indicated by a pointer such as an SMS character string can advantageously be a service or program guide, which may conveniently but not necessarily look similar to a main page of a conventional text-TV channel. By providing a sufficient number of physical timeslots for the extension channel, several main pages or channels can be pointed out, for example one for each broadcast service node or broadcast production available from the communication system. Three such main pages in timeslot TS1 are indicated by the three arrows that point to respective pairs of subsequent timeslots. It is advantageous for the content of a Service Guide to be continuously updated to the terminal.

One or more suitable pointers such as character strings on a main page can point to another extension channel or channels, which are carried by the additional timeslot(s) pointed out. In the example shown in FIG. 1, an extension channel called TV channel1 is carried by timeslots TS2 and TS3, another extension channel called TV channel2 is carried by timeslots TS4 and TS5, and yet another extension channel called TV channel3 is carried by timeslots TS6 and TS7. Thus, the whole BCCH is indicated as allocated for broadcast channels, but this is not necessary. Moreover, the channels carrying the unacknowledged multimedia information, such as the Service Guide and three TV channels in this example, can be arranged in any suitable way among the allocated timeslots.

Figure 2:
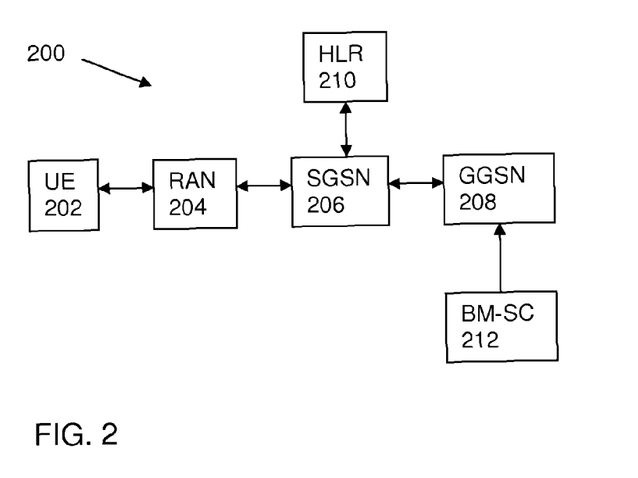
FIG. 2 is a block diagram of a communication system.

FIG. 2 is a block diagram of a communication system 200 that can employ the channel structures described in this application. A mobile terminal, or user equipment (UE) 202, communicates through a radio access network (RAN) 204, such as GSM/EDGE, with core-network entities, including a servicing GPRS support node (SGSN) 206, a gateway GSN (GGSN) 208, a home location register (HLR) 210, and a broadcast/multicast service center (BM-SC) 212. The core-network entities are conventional and adapted to handle MBMS and multimedia information generally. In a typical GSM/EDGE network, a PDP Context for administering data flows is set up in the GGSN 208 in response to a request from the terminal/UE 202.

In particular, the BM-SC 212 is responsible for providing and delivering mobile broadcast services, and serves as an entry point for content-delivery services or servers that want to use MBMS. It sets up and controls MBMS transport bearers to the RAN 204 and can be used to schedule and deliver MBMS transmissions. The BM-SC 212 can also provide service announcements to UEs that contain information needed to join an MBMS service. The BM-SC 212 can be used to manage security functions specified for multicast mode. The RAN 204 includes one or more base stations and base station controllers, or Node Bs and radio network controllers (RNCs), that are conventional except to the extent that the radio signals transmitted toward the UE include the channel structures described in this application.

Figure 3A:
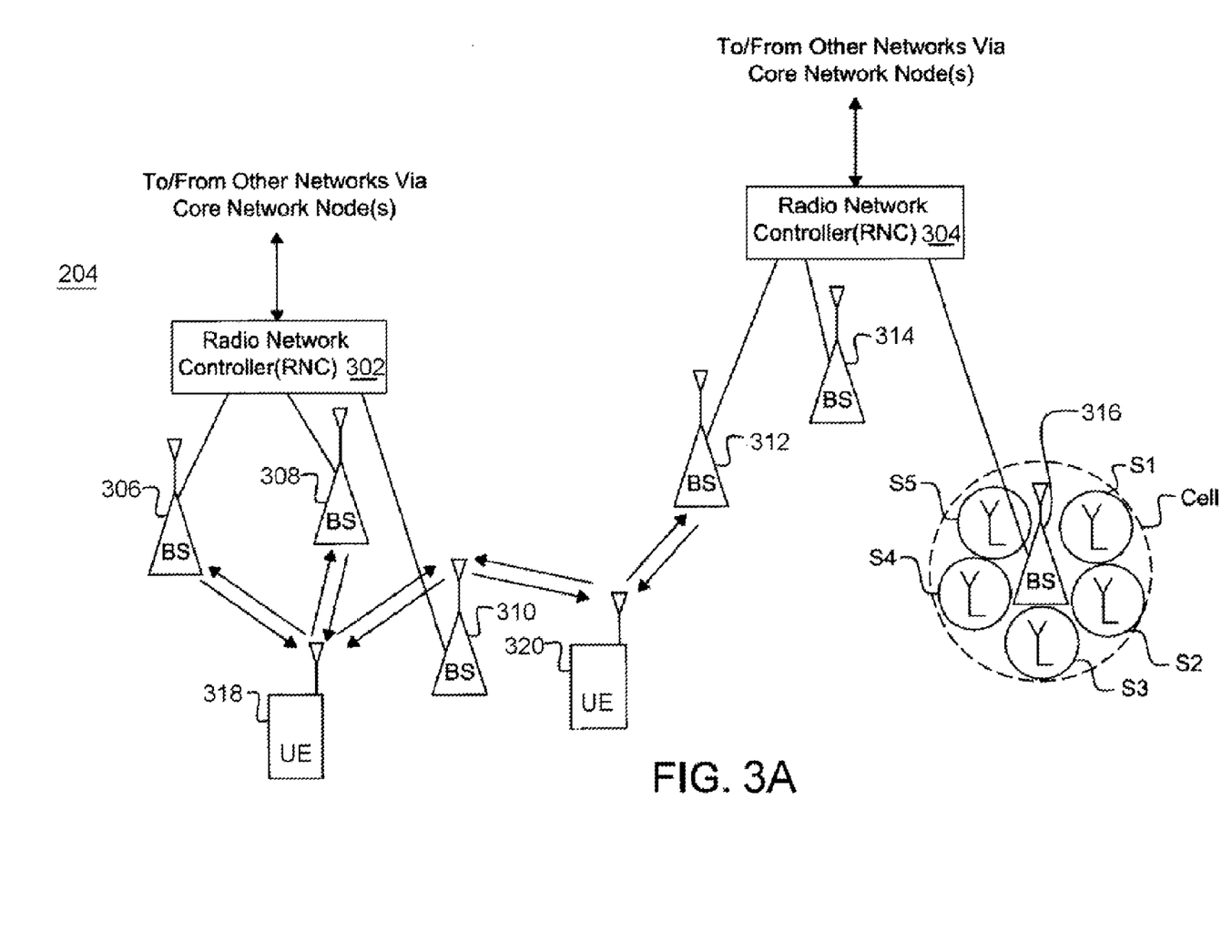
FIG. 3A is a block diagram of a radio access network in a communication system.

FIG. 3A depicts the RAN 204 in more detail. Radio network controllers (RNCs) 302, 304 control various radio network functions, including for example radio access bearer setup, diversity handover, etc. More generally, each RNC directs calls to and from a terminal/UE via the appropriate BSs, which communicate with each other through downlink (i.e., base-to-mobile or forward) and uplink (i.e., mobile-to-base or reverse) channels. In FIG. 3A, RNC 302 is shown coupled to BSs 306, 308, 310, and RNC 304 is shown coupled to BSs 312, 314, 316.

Each BS, or Node B in 3G vocabulary, serves a geographical area that is divided into one or more cell(s). In FIG. 3A, BS 316 is shown as having five antenna sectors S1-S5, which can be said to make up the cell of the BS 316, although a sector or other area served by signals from a BS can also be called a cell. The BSs are typically coupled to their corresponding RNCs by dedicated telephone lines, optical fiber links, microwave links, etc. The RNCs 302, 304 are connected with external networks such as the public switched telephone network (PSTN), the internet, etc. through one or more core-network entities.

As UEs move with respect to the BSs, and possibly vice versa, on-going connections are maintained through a process of handover, or hand-off, in which as a user moves from one cell to another, the user's connection is handed over from one BS to another. In FIG. 3A, UEs 318, 320 are shown communicating with plural BSs in diversity handover situations. UE 318 communicates with BSs 306, 308, 310, and UE 320 communicates with BSs 310, 312. A control communication link between the RNCs 312, 314 permits diversity communications to/from the UE 320 via the BSs 310, 312.

Figure 3B:
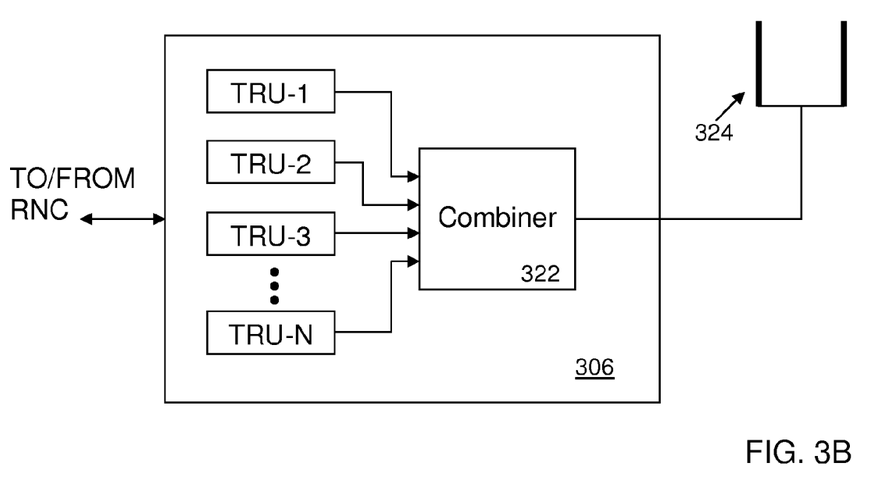
FIG. 3B is a block diagram of a base station in a radio access network.

FIG. 3B is a block diagram of the base station 306 that shows portions of the BS involved in generating the BCCH as described in this application. It will be appreciated that FIG. 3B shows an arrangement that is typical of base stations in the communication system 200. A base station includes a number of transceiver units for two-way communication with UEs in the system, and FIG. 3B indicates these transceiver units TRU-1, TRU-2, TRU-3, . . . , TRU-N. In principle, the number of transceiver units is not restricted; it may even be zero.

Each TRU is typically allocated a respective "channel group", which is a set of downlink and possibly uplink radio carrier signals having frequencies planned with a given frequency reuse pattern in the system. In FIG. 3B, the transceiver unit TRU-1, for example, can belong to the channel group "BCCH" and the other transceiver units can belong to the channel group "TCH", or "traffic channel". Alternatively, there can be a number of different TCH channel groups, with one or more of the transceiver units belonging to each of the different groups, thereby enabling the different TCH groups to be planned with different frequency reuse patterns.

A transceiver unit advantageously (but not necessarily) includes all functionality needed for handling radio signals in the communication system, e.g., the eight time slots in a time-division multiple-access (TDMA) frame like that depicted by FIG. 1, including timing reference generation, signal processing, radio receiving, and transmitting and power amplification. Thus, a transceiver unit typically includes radio transmitting and receiving components that are controlled by and provide signals to and from one or more processors. For example, a transceiver unit can generate a signal having a plurality of frames, and each frame can include at least one of forward error correction and an error detection element through suitable operation of the transceiver's signal processing and other functionality, which may include suitable processing resources for enciphering/deciphering signals.

As indicated in FIG. 3B, signals to and from the transceiver units pass through a combiner 322 on their ways to or from the base station's antenna 324. The combiner 322 combines transmitted signals from the several transceiver units and distributes received signals to the transceiver units.

Thus, it will be understood that the TRU in the BCCH channel group formulates radio-frequency signals that are provided to the antenna 324. The signals have a channel structure configured for multimedia information, including a broadcast communication channel, e.g., a BCCH, divided into a plurality of timeslots. As indicated for example by FIG. 1, a predetermined one of the timeslots includes a pointer that points out at least one extension channel that is included in at least one other timeslot in the radio signals and that carries unacknowledged multimedia information.

It is currently believed for system capacity reasons that the BCCH is suitable for carrying broadcast channels in this way. The BCCH is used for handover measurements and so the BCCH is continuously transmitted and cell planning is made with a high frequency-reuse factor. The already continuous broadcast of the BCCH carrier means that adding broadcast capability to a system would not increase the activity factor or interference level. Radio signal quality or received signal strength will also typically be good at cell borders.

It will be understood, however, that BCCH channels are not the only possibility for broadcast-like information as described above. Carriers used for TCHs in the RAN can also be used. Even if a TCH has lower radio quality and a lower timeslot bit rate than a BCCH, more timeslots can easily be used to obtain comparable service. A system operator can determine the number of timeslots, service, and quality of its broadcasts by suitable dimensioning. The modulation and coding scheme (MCS) for transmission in the RAN may be chosen based on desired quality, coverage, and frequency plan, and the number of channels allocated for broadcast may be based on capacity and desired service requirement, e.g., the codec bit rate for the desired broadcast TV service. A number of different schemes (MCS-1 to MCS-9) are currently standardized for EGPRS. MCS-1 to MCS-4 use Gaussian minimum shift keying (GMSK) modulation, and MCS-5 to MCS-9 use (37/8) 8-ary phase shift keying (8-PSK) modulation. As discussed above, an advantage of this arrangement is the absence of a requirement for special interaction between a terminal and a base station. The base station need only continuously transmit unacknowledged multimedia information, and can be unaware of a receiver's position or activation. The terminal selects a channel of the broadcast information and also advantageously selects the best transmitter of that information.

Figure 4:
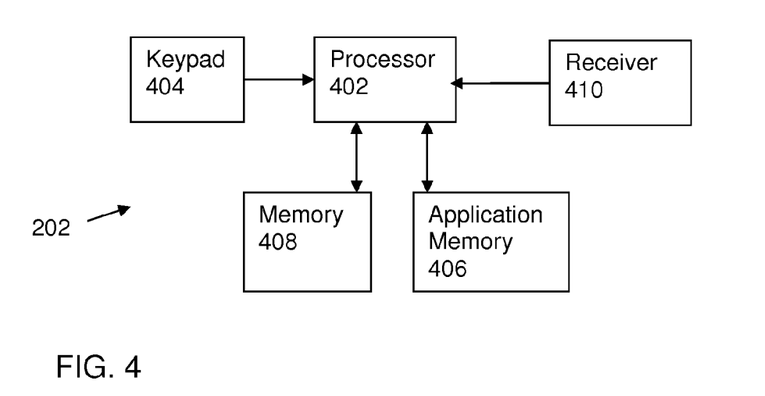
FIG. 4 is a block diagram of a mobile terminal.

FIG. 4 is a block diagram of a mobile terminal or UE 202. To facilitate selection of broadcast information, a software application executed by a processor 402 in the terminal 202 may advantageously re-define the terminal's keypad 404. The software application may be stored in a suitable application memory 406 and operate for example such that "1" on the keypad means channel 1, which is then the Service Guide in the arrangement depicted in FIG. 1. This is described in more detail below.

The terminal 202 may also download and/or cache desired information in a suitable memory 408 based on user preferences and terminal applications. With cached information, instant channel switching between broadcast TV channels can be done because a streaming buffer need not be initiated. Either all broadcast channels can be downloaded and/or cached or one or more channels can be downloaded and/or cached according to user configuration or previous usage. Non-real time transmissions, e.g., news clips, may be downloaded and dynamically updated via the Service Guide to be viewed at the user's convenience. Time-stamping and storage refresh would then possibly be needed, as well as Service Guide updating. For example, a Service Guide update can be sent with new content (that is described in the update), a respective memory pointer, and a time stamp. The new content can be presented on the broadcast channels and the pointer to the new content can be presented in the Service Guide. In this way, a larger amount of data (clips) can be offered per timeslot without any change in user access delay since the refresh rate can be increased. Although some content may not be real-time and may be viewed at the user's convenience, such content can still be updated with current information.

In the simplest form of this arrangement, it is not necessary specially to select the "best" base station, and thus no special control signaling is necessary. The typical cell selection that is carried out for handling connection handovers should be sufficient to ensure adequate operation. Besides cell selection, another approach to ensuring that a terminal receives a suitable broadcast signal is to use macro diversity combining, in which signals broadcast from different transmitters are received and combined by a terminal in its receiver front end 410. Such operation is common in mobile telephone systems, and would need broadcast content synchronization between base stations so that a terminal is able to decode and combine multiple received signals. With synchronized transmissions on TCHs with a frequency-reuse factor of 1, macro diversity can be achieved since an equalizer in the terminal's receiver 410 can combine the different cell's signals. With macro diversity, the coverage is improved as well as the bit rate at cell borders.

Broadcasting TV in a GSM/EDGE communication system as described here would typically use unencrypted transmission with unacknowledged-mode radio link control (RLC). Unencrypted transmission is supported in the 3GPP standard, e.g., 3GPP TS 04.64 V8.7.0, General Packet Radio Service (GPRS); Mobile Station—Serving GPRS Support Node (MS-SGSN) Logical Link Control (LLC) layer specification, Rel. 99 (December 2001). If encryption is desired, it can be performed at the application layer or be controlled by subscription. Encrypted channels can be used for "pay" content, such as pay-per-view events.

Ordinary GPRS channels are set up from the BM-SC 212 or other provider of broadcast content to the base stations in the RAN 204. Content changes (within the available broadcast channels' capacity) and quality can be managed by the BM-SC. Also, the BM-SC can change the channel structure or timeslot tree such as that depicted in FIG. 1 below the main-page (timeslot TS1) without changing other parts of the network configuration.

To display real-time TV on a typical mobile phone with acceptable quality requires a data rate of about 40 kbps with no more than perhaps about 2% BLER. The BCCH is typically planned with a frequency reuse factor of 12 to 15, which results in a carrier/interference (C/I) ratio of 10 dB to 12 dB at the cell border. The MCS-5 scheme provides 22 kbps/timeslot and around 1% BLER at a C/I of 10 dB. It will be understood that the "packet error rate" corresponding to a 1% BLER depends on the length of the transmitted IP packets because the transmission is unacknowledged. If further improved BLER is required, then error correction techniques, such as the Forward Error Correction (FEC) (e.g., block codes, convolutional codes, Turbo codes, and their variations), could be used, in which case more bandwidth (about 5%-10%) would be required. Using two BCCH timeslots for a TV channel as depicted in FIG. 1 may provide the data rate needed for acceptable quality.

Thus, three TV channels could be served on the BCCH as depicted by FIG. 1, with room for a channel that can be carried by a timeslot with a 22 kbps data rate, which can be a service guide and also information such as text news, photos, and video clips. This channel can transmit information in a cyclic fashion, i.e., all information is not transmitted in each timeslot, and the mobile can store this information for fast access. The information content can be similar to conventional text-TV/Tele-text, or more advanced, with multimedia content including sounds and images.

It is currently believed that typical "off-line" information content includes more or less static text, photographs, and recorded sound and that typical "on-line" information content includes streaming information such as broadcast television and radio. From one point of view, off-line content is similar to a book or newspaper. It will be understood, however, that these categories do not have well-defined borders. In general, however, off-line content may be provided with coding and/or transmission formats that are different from those used for providing on-line content.

It is currently believed that off-line content should include fewer errors than on-line, or streaming, content in order to match user expectations that are based on experiences with books and television. Accordingly, a UE should store in its memory transmitted content that has been received and decoded without error. To avoid having to re-transmit possibly lengthy content, content can advantageously be divided into segments, or frames, that are repeatedly transmitted, with each frame having a respective error detection/correction scheme, such as FEC and/or a cyclic redundancy check or checksum element. If a received frame had an error that was not corrected, the UE would attempt to receive and decode a subsequent transmission of that frame and insert the correctly decoded frame in the memory in place of the erroneous frame. Thus, a receiver can have many chances to detect and correct errors in received content, including scrapping part of the content and waiting for re-transmission. If a user chooses to view stored content that includes one or more erroneous frames, the erroneous frame or frames would preferably be identified as such in a convenient way to the user.

Media broadcasting in a GSM/EDGE or similar communication system as described here is flexible and may be extended, improved, and enhanced in a number of ways.

For example, if spectrum is available, more TV channels may be added by allocating the spectrum to broadcast transmission over traffic channels. In a typical GSM communication system, frequency reuse must be similar to current BCCH reuse to fulfill requirements on the radio environment. The same tree-structure shown in FIG. 1 having a "TV Broadcast pointer" can be used to define additional TV broadcast channels on TCH frequencies. In this case, the number of timeslots needed per channel would depend on the frequency reuse, chosen coding scheme, etc., chosen by the system operator. Coverage and capacity would also depend on network planning.

If this application's media broadcasting is based on a cellular-communication-system structure, it is simple to implement different levels of "local" broadcast transmission. Depending on demand and interest, TV channels can be broadcast in smaller or larger parts of the cellular network, i.e., by different base stations. It will be understood that this invention is not limited to cellular communications systems, and in particular this invention is not limited to GSM/GERAN systems.

Interactive or reactive add-on services, such as voting, placing orders, etc., can be supported by the enhanced channels described here, although a feedback channel from the terminal to the base station would be required. Such a feedback channel can be readily accomplished with class-A terminals that have two separate radio transceivers, or even by modification of the existing telecommunication standard applicable to the particular communication system. Possibly, a terminal with two receiver chains but only one transmitter could be used, in a manner similar to a typical GSM/EDGE handset that has a DVB-H receiver.

A dedicated feedback channel enables user interactivity. Information about voting, selection, buying for the application is embedded in the broadcasted content, either in the "Program Guide" or along with the audiovisual content. The terminal application may store selections for later uplink transmission or, if a backchannel is available, transmit the result back to the server. One possible way to do this is "return SMS". For simplicity for the user, casting a vote can be done by actuating the yes/no buttons on the phone.

A feed-back channel can be used to order "pay-per-view" content, and decryption keys for such content can be made available either via the Service Guide on TS1 or on a dedicated forward channel. If a separate forward channel is not available, a common content decryption key can be provided in an encrypted form through the Service Guide, and users who have paid for the requested content can decrypt the encrypted form with user keys that they already have. The Service Guide can be continually updated with users who have paid and are allowed to obtain the content decryption key.

It may also be advantageous that while a terminal is in TV mode, i.e., being used to receive broadcast information, the digit buttons on the terminal's keypad are used to select a TV channel. For example, pressing "1" could mean that TV channel 1 is selected, pressing "2" that TV channel 2 is selected, etc. A joystick or other suitable device on the terminal could be used for volume control or step-wise channel selection. In this way, the physical layer is controlled from the keypad of a terminal.

Figure 5:
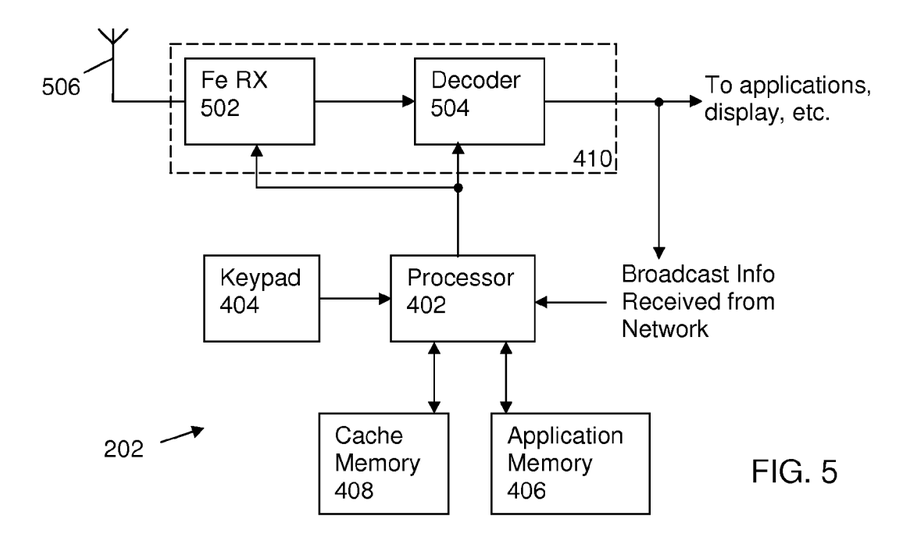
FIG. 5 is a more detailed block diagram of a mobile terminal.

For example, the UE may include keys dedicated for selection of broadcast content. A key-press can then be interpreted such that the physical layer in the UE (i.e., the receiver 410) should receive and decode timeslots 4 and 5 for an arrangement such as that depicted in FIG. 1. A block diagram of a UE 202 having such capability is shown in FIG. 4, and a more detailed block diagram is FIG. 5. Based on user-input information from the keypad, keyboard, or joystick 404 and information about the broadcast system, e.g., the channel guide, which may be received from the network through the receiver 410 as described above, the control processor 402 determines which timeslot(s) to receive and decode. The timeslot information is then fed both to a front end receiver (Fe RX) 502 and a decoder 504 that are included in the receiver 410. The Fe RX 502 and decoder 504 are the "physical layer" in the UE 202. The Fe RX 502 receives signals captured by a suitable antenna 506 and down-converts those signals to baseband. For power conservation, the Fe RX 502 is turned on during the timeslots corresponding to the TV broadcast selected by the user through the keypad 404 so that the broadcast is received and decoded.

Figure 6:
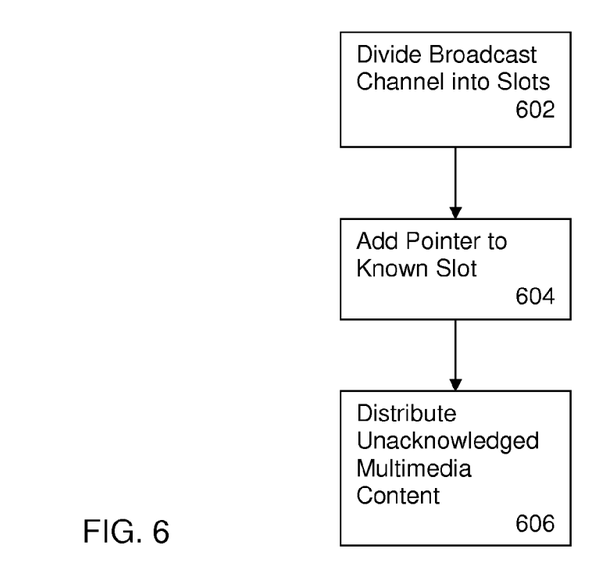
FIG. 6 is a flow chart of a method of distributing multimedia information.

FIG. 6 is a flow chart of a method of distributing multimedia information that is in accordance with one of the many aspects of this invention. In step 602, a broadcast communication channel is divided into a plurality of timeslots. In step 604, a pointer is included in a predetermined one of the timeslots that points out at least one extension channel. As described above, the one or more extension channels are included in at least one other timeslot of the same or another broadcast communication channel and carry unacknowledged multimedia information. In step 606, the multimedia information is distributed by unacknowledged transmission of the broadcast channel.

Important advantages of the broadcast techniques and systems described here are expected to be that efficient service provisioning is made possible and that "TV Concept" requirements, e.g., fast switching between different TV channels, can be fulfilled, at the same time as no new network nodes or radio hardware are required. The broadcast solution enables efficient delivery of TV content to multiple users in a cell. At the same time, fast switching between channels is made possible, assuming that all available channels are continuously transmitted/broadcasted.

These techniques may be implemented within the existing GSM/EDGE standard, e.g., 3GPP Rel. 5, with no or very minor impact on existing legacy terminals; radio environment (interference) if the TV service is transmitted over the BCCH; architecture, signaling, etc.; and radio and core networks. For the simplest form of TV Broadcast over GSM/EDGE, no or possibly only moderately changed new software might be required. Assuming that necessary hardware requirements, e.g., GSNs and EDGE-capable TRUs, are available, no additional new equipment (in addition to terminals having suitable TV applications) is necessary.

It is expected that this invention can be implemented in a wide variety of environments, including for example mobile communication devices. It will also be appreciated that procedures described above are carried out repetitively as necessary. To facilitate understanding, aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A radio access network configured for distribution of multimedia information, comprising:
   a base station configured to broadcast radio signals having a channel structure configured for the multimedia information, wherein the base station includes a transmitter configured to transmit a broadcast communication channel divided into a plurality of timeslots, and a pointer included in a predetermined one of the timeslots that points out at least one extension channel that is included in at least one other broadcast timeslot in the radio signals and that carries unacknowledged multimedia information transmitted by the transmitter;
   wherein the communication channel is a broadcast control channel (BCCH), the at least one other timeslot is included in the BCCH, the BCCH includes a short message service (SMS) channel, and multimedia information carried by the extension channels comprises at least one of off-line information and streaming television programs, and service guide information that includes television program information.

2. The radio access network of claim 1, wherein the pointer includes hidden information that comprises at least one of a modulation and coding scheme used on an extension channel and information on which timeslot corresponds to which broadcast channel.

3. The radio access network of claim 2, wherein the off-line content is carried by an extension channel as a plurality of frames and each frame includes at least one of forward error correction and an error detection element.

4. A method of distributing multimedia information in a communication system, comprising:
   dividing, by a base station in the communication system, a broadcast communication channel into a plurality of timeslots; and
   including, by the base station, a pointer in a predetermined one of the timeslots, wherein the pointer points out at least one extension channel that is included in at least one other timeslot of the broadcast communication channel and that carries unacknowledged multimedia information;
   wherein the communication channel is a broadcast control channel (BCCH) of the base station, the at least one other timeslot is included by the base station in the BCCH, the BCCH includes a short message service (SMS) channel, and multimedia information carried by the extension channels comprises at least one of off-line information and streaming television programs, and service guide information that includes television program information.

5. The method of claim 4, wherein the pointer is a character string included in a timeslot zero.

6. The method of claim 4, wherein the including step comprises the step of including hidden information in the pointer, and the hidden information comprises at least one of a modulation and coding scheme used on an extension channel and information on which timeslot corresponds to which broadcast channel.

7. The method of claim 4, wherein the plurality of timeslots include a plurality of extension channels, and the dividing step comprises the step of arranging the extension channels in a tree structure having a root in the timeslot that includes the pointer.

8. The method of claim 4, wherein the off-line content is carried by an extension channel as a plurality of frames and each frame includes at least one of forward error correction and an error detection element.

9. The method of claim 7, wherein a first extension channel pointed to by the pointer carries service guide information.

* * * * *

UNITED STATES PATENT AND TRADEMARK OFFICE
CERTIFICATE OF CORRECTION

| | | |
|---|---|---|
| PATENT NO. | : 7,969,935 B2 | Page 1 of 1 |
| APPLICATION NO. | : 12/857406 | |
| DATED | : June 28, 2011 | |
| INVENTOR(S) | : Simonsson et al. | |

It is certified that error appears in the above-identified patent and that said Letters Patent is hereby corrected as shown below:

In Column 3, Line 12, delete "information" and insert -- information. --, therefor.

In Column 7, Lines 4-16, delete "A system......modulation." and insert the same at line 5, as a new paragraph.

In Column 7, Line 15, delete "(37/8)" and insert -- (3π/8) --, therefor.

In Column 7, Lines 16-23, delete "As discussed.....information." and insert the same at line 17, as a new paragraph.

In Column 11, Line 36, in Claim 1, delete "the-base" and insert -- the base --, therefor.

Signed and Sealed this
Twentieth Day of December, 2011

David J. Kappos
*Director of the United States Patent and Trademark Office*